United States Patent [19]

Galvin

[11] 4,413,423
[45] Nov. 8, 1983

[54] SUN TRACKING DEVICE

[76] Inventor: Ralph B. Galvin, 2350 E. 91st St., Indianapolis, Ind. 46240

[21] Appl. No.: 294,493

[22] Filed: Aug. 20, 1981

[51] Int. Cl.³ .............................................. G01C 1/00
[52] U.S. Cl. ..................................... 33/268; 33/1 SA
[58] Field of Search .............. 33/268, 269, 270, 1 SA, 33/1 SB, 1 SC, 271, 272, 273; 434/131, 148, 111, 284

[56]                References Cited
           U.S. PATENT DOCUMENTS

| | | | |
|---|---|---|---|
| 205,485 | 7/1878 | Holmes | 33/270 |
| 538,889 | 5/1895 | Arvidson | 33/487 |
| 702,354 | 6/1902 | Beal | 33/272 |
| 1,547,940 | 7/1925 | Monney | 33/1 SA |
| 2,429,754 | 10/1947 | Hagner | 33/269 |
| 2,483,228 | 9/1949 | Palmer | 33/1 SA |
| 2,839,833 | 6/1958 | Hagner | 33/269 |
| 3,066,415 | 12/1962 | Jefferson | 33/268 X |
| 3,940,859 | 3/1976 | Troseth | 33/270 |
| 4,236,313 | 12/1980 | Griffin, Jr. | 33/1 SC |

Primary Examiner—William D. Martin, Jr.

[57]                ABSTRACT

The device comprises a declination adjustable solar ray directed assembly straddling the rim of a circular segment, hinged on the polar axis of an equatorial mount. The circular segment has a holding means for positioning it on the rim of a time dial placed on the equatorial mount. Shoes are attached to the solar directed assembly and ride on the rim of the circular segment, or shoes are attached to a support stand for the equatorial mount and ride on the rim of the equatorial mount. The support stand has a leveling base with two pairs of adjustable legs and pivoted feet providing stiffness in mutually perpendicular planes while allowing for tilting adjustment in alternate planes during the leveling operation.

10 Claims, 4 Drawing Figures

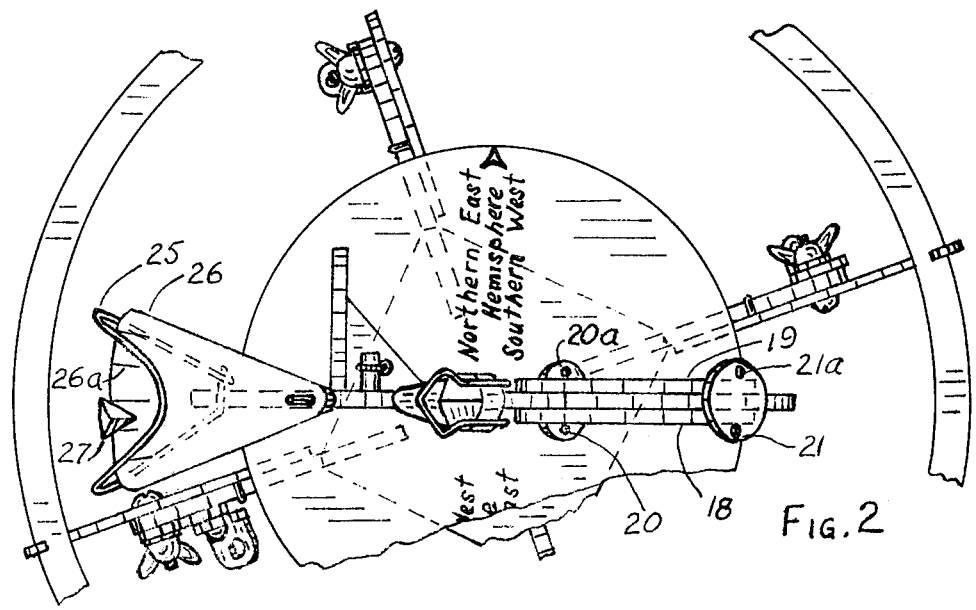
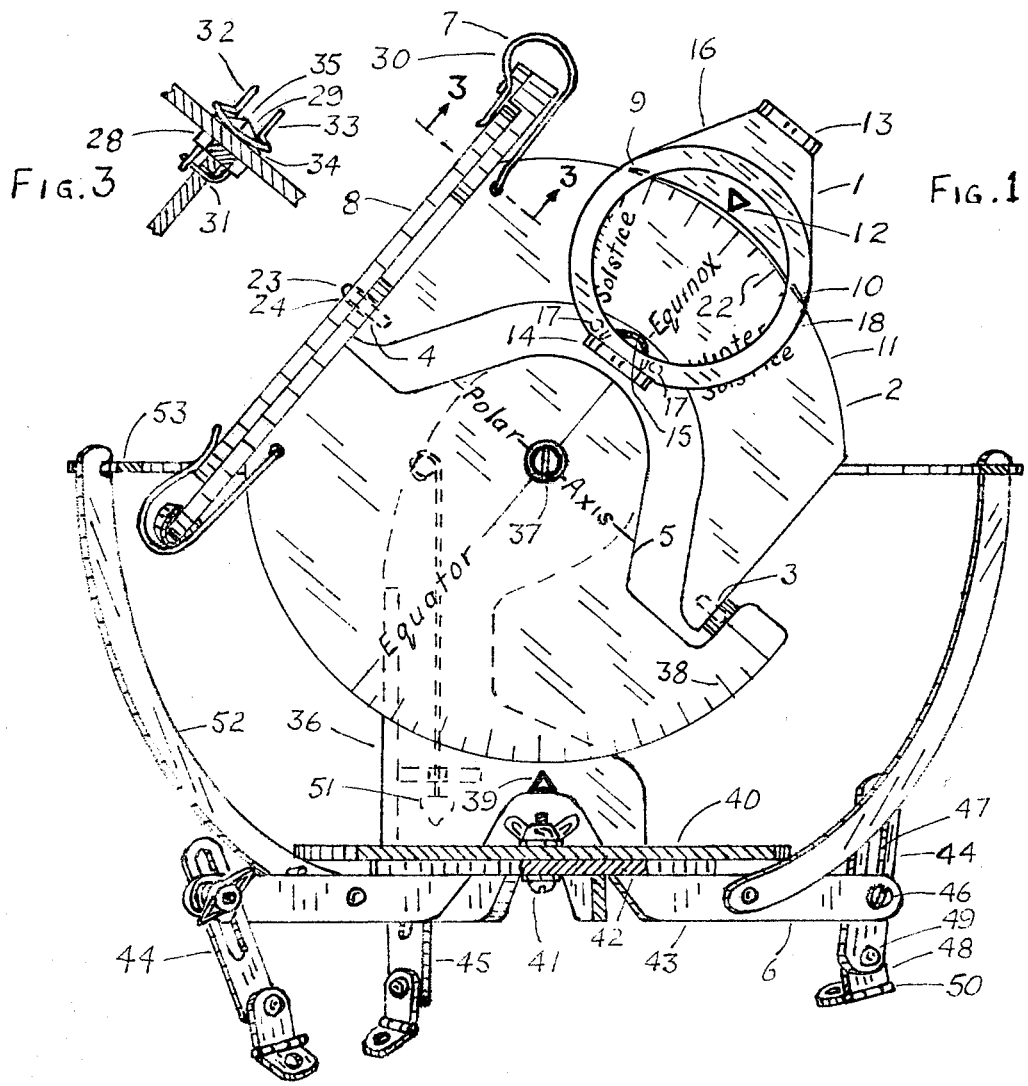

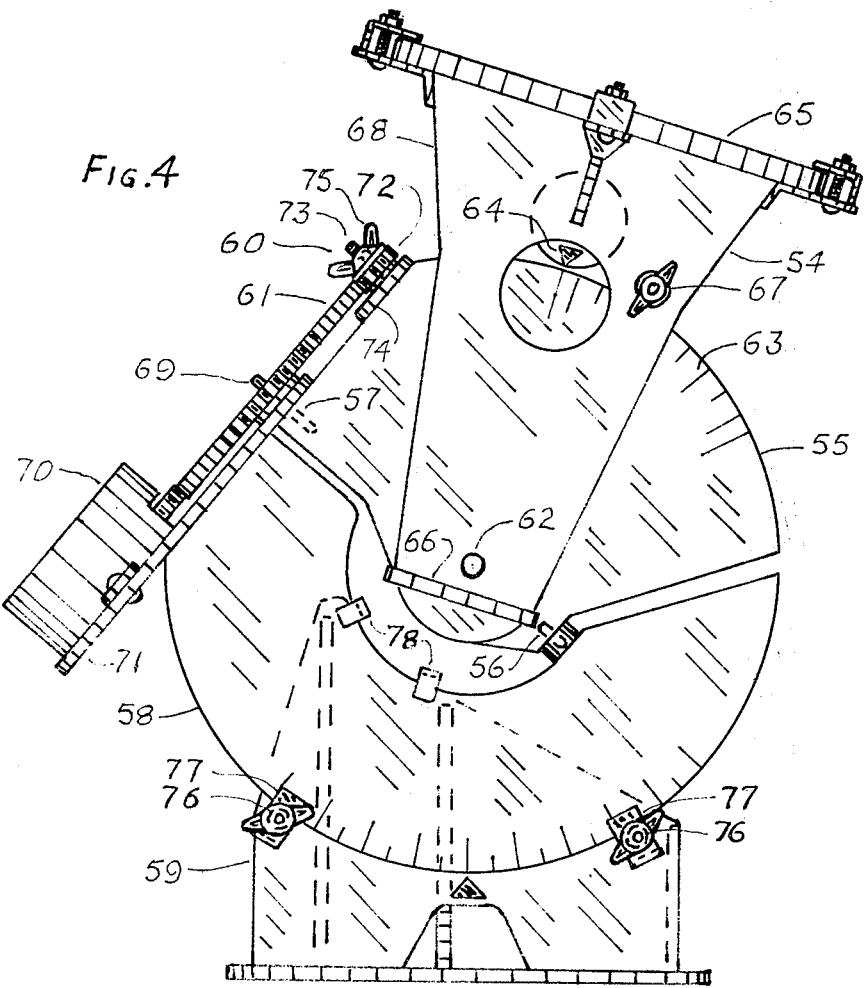

SUN TRACKING DEVICE

FIELD OF THE INVENTION

The present invention relates to the fields of astronomy and surveying, and more particularly to devices for tracking and demonstrating the path of the sun across the sky as may be viewed by an observer anyplace on earth and anytime of year.

PRIOR ART

Many variations and improvements in sun tracking devices have been invented. Holmes U.S. Pat. No. 205,485 issued July 2, 1878 and Troseth U.S. Pat. No. 3,940,859 issued Mar. 2, 1976 each disclose a solar ray direction indicator consisting of a part with an aperture or lens and a target or eyepiece pivoted on a bracket attached to an equatorial time dial. Jefferson U.S. Pat. No. 3,066,415 issued Dec. 4, 1962 discloses a semi-annular declination indicator hinged on the polar axis of an equatorial mount and adjustably positioned relative to an hour angle quadrant.

The present invention uses the rim of a circular segment hinged on the polar axis of an equatorial mount for positioning a straddling solar ray directed assembly adjustable to the sun's declination angle, and the rim of an equatorial time dial for positioning the circular segment. Construction is simplified for solar tracking purposes; and the relationship of the sun's path to the equatorial plane, the polar axis, and the observor's horizon is more clearly demonstrated.

SUMMARY OF THE INVENTION

The present invention is directed to a solar ray tracking device that is simply constructed and easy to understand and set up for demonstrating how the sum shines on the earth and the basics of navigation, surveying, and time measurement, and for use as a concentrating solar energy collector.

Dimensionally stable flat sheet stock, such as acrylic plastic, may be used for the main components, utilizing the characteristics of flatness for simple low cost accurate alignment of these components and to provide suitable areas for appropriate graphical illustration and instructions.

The invention comprises a solar ray directed assembly adjustably positioned to the sun's declination angle on the rim of a circular segment, hinge supported on the polar axis of an equatorial mount.

The circular segment has a holding means at one end of its rim portion for positioning it on the perimeter portion of a time element, such as a stationary dial or a clock driven gear, lying in a plane parallel to the plane of the equator and centered on the polar axis of the equatorial mount. The holding means is manually positioned when a stationary time element is used; and rotates with the time element when a clock drive is used.

Latitude, declination and meridian scales, time and compass dials, a leveling base, an horizon ring, a clock drive, and equipment for utilizing solar rays may be added to the basic assembly.

The center of rotation of the solar directed assembly for the declination setting coincides with the rotational axis of the equatorial mount for the latitude setting. To avoid interference which would result from the use of pivot centers for both of these settings, either the solar directed assembly or the equatorial mount is kept in radial alignment with its center of rotation by means of shoes bearing of a concentric rim. In the first instance, the shoes are attached to the solar directed assembly and ride on the rim of the circular segment. In the second instance, the shoes are attached to the stand, and the rim of the equatorial mount rides on the shoes.

In one arrangement of the invention, such as may be used for demonstrating the sun's path for educational purposes, the solar ray directed assembly has a replica of the sun at its outer extremity.

For use as a surveying instrument a target member is located at the inner extremity of the solar ray directed assembly; apertures are made in the replica; and targets are placed on the target member in radial alignment with corresponding apertures. An aperture and a target are provided on each side of the circular segment for convenience in viewing both morning and afternoon while aligning the sun's image produced by the aperture on to the corresponding target when tracking the sun.

The circular segment is manually positioned relative to the rim of a time dial by a holding means which may be released by pinch pressure. A time indicator is incorporated on the holding means. The time dial is reversible for use in either hemisphere.

In another arrangement of the invention, such as may be used for solar energy collection and conversion, the solar ray directed assembly is provided with a concentrating collector, such as a Fresnel lens at its outer extremity, and shelves located near the focal point of the lens near its inner extremity for holding a solar energy converter, such as a photovoltaic cell array or a hot water heating coil.

The circular segment is rotated about the polar axis of the equatorial mount by a holding means which engages the rim portion of a twenty four hour rotation time element, centered on the polar axis of the equatorial mount, for continuous tracking of the sun during daylight hours.

In various arrangements of the invention, latitude, declination and meridian scales, and time and compass dials function as do other equatorial mounted solar devices to allow for adjustment for latitude, declination, equation of time, and longitude position relative to the time zone meridian.

However, the co-planar arrangement of the latitude and declination scales together with the location of the sun's replica outboard of the declination scale rim more clearly depicts the relationship of the earth's polar axis, equatorial plane, and the observor's horizon with that of the sun's path across the sky.

A leveling base is provided for portable use and fast set up. The leveling base has a pair of co-planar legs, adjustable in both length and angle relative to the base when unclamped, and rigid in this plane when clamped while remaining flexible in a direction normal to the plane, and a second pair of legs similar to the first having its corresponding plane intersect that of the first at right angles. The legs have pivoted feet to allow for fixed attachment to available firm surfaces prior to leveling.

DESCRIPTION OF THE DRAWINGS

Features of the present invention are described in the following description made in conjunction with the accompanying drawings in which:

FIG. 1 is an elevation view of a form of the sun tracking device such as may be used for educational purposes.

FIG. 2 is a plan view of the same device with the time dial removed.

Both views have portions of the base, compass dial and horizon ring broken away for illustrative purposes.

FIG. 3 is a partial view of section 3—3 of FIG. 1 providing another view of the time indicator and clamp.

FIG. 4 is an elevation view of another form of the sun tracking device such as may be used for solar energy collection.

DESCRIPTION OF PREFERRED EMBODIMENTS

FIGS. 1–3

The major components consist of a solar ray directed assembly 1, positioned on a circular segment 2, supported on hinges 3 and 4, aligned on the polar axis of an equatorial mount 5, mounted on a leveling base 6. The circular segment 2 has a holding means 7 for positioning it on a time dial 8.

The solar ray directed assembly has shoes 9 and 10, bearing at spaced apart points on the circular segment rim 11, a declination indicator 12, a replica of the sun 13, a target member 14, a declination holding means 15, outer rim spacer 16, inner rim spacers 17, and straddle parts 18 and 19. Shoes 9 and 10, declination indicator 12, and outer rim spacer 16, may be combined in a single piece of flat stock. Straddle parts 18 and 19 may be similar. Outer rim spacer 16, and inner rim spacers 17, may have the same thickness as the circular segment 2, or other means, not shown, such as springs or a pressure pad may be used for maintaining parallel alignment of the straddle part 18 or 19 with the circular segment 2.

The declination holding means 15 may be a simple leaf spring, as shown. Other means, not shown, such as a screw clamp may be used to hold shoes 9 and 10 in contact with the circular segment rim 11 and retain the declination setting.

The target 20 on the target member 14 and the aperture 21 on the replica of the sun 13, are on a line of sight which is parallel to a radial line originating at the intersection of the polar axis with the equatorial plane, and parallel to the face plane of the circular segment 2. An aperture 21a, and a corresponding target 20a, may be located on the opposite side of the circular segment 2, as shown in FIG. 2, for easy viewing while tracking both morning and evening. The target 20, may be a hole the same size as the aperture 21, in which case the sun's image will be slightly larger than the hole and will ring the hole when properly aligned. The target member 14 may be made of translucent material so that the target 20 and the sun's image may be viewed from the underside, as well.

The straddle parts 18 and 19 may be transparent or ring formed, as shown in FIG. 1, for wide viewing of the declination scale 22 on the circular segment 2. Calendar dates may be substituted for degrees of arc on the declination scale 22 and opposite sides of the circular segment 2 used for the two hemispheres.

Hinge 4 may have its pivot pin 23, protruding sufficiently for insertion into the center hole 24 of time dial 8, as shown in FIG. 1. Time dial clip 25 holds the time dial 8 in place on equatorial saddle 26 which is integral with the equatorial mount 5. The time dial 8 may be lifted off the pivot pin 23 and reversed for use in both hemispheres. The time dial 8 may be rotatively adjusted under the time dial clip 25 for time zone longitude determination. Longitude indicator 27 is used for marking the longitude relative to the time zone meridian on the longitude scale 26a. An annalema, not shown, on the face of the time dial 8 may be used as an aid to compensate for the solar equation of time in longitude determinations.

The holding means 7 consists of a time indicator bracket 28, a dual ramp 29, and a pinch release clamp 30. The time indicator bracket 28 and the dual ramp 29 are integral with the circular segment 2. The pinch release clamp 30 is made of spring wire attached to the circular segment 2 through hole 31.

Pinching the opposing loops 32 and 33 of the pinch release clamp 30 lifts the clamping loop 34 off the surface of the time dial 8 due to the sliding contact action on the inner ends of loops 32 and 33 moving up toward the apex of the dual ramp 29, thereby allowing the circular segment 2 to be repositioned relative to the time dial 8.

A mark 35 on the inner edge of the dual ramp 29 may serve as a time indicator.

The equatorial mount 5 is attached to stand 36 by pivot clamp 37 for the latitude adjustment. The equatorial mount 5 may be provided with a latitude scale 38 and the stand 36 provided with a latitude indicator 39.

The stand is attached to compass dial 40 which may be attached to the leveling base 6 by pivot clamp 41 for aligning the polar axis of the equatorial mount 5 with that of the earth's.

The leveling base 6 has a baseplate 42 to which are attached four radially disposed struts 43, spaced 90° apart. Legs 44 and 45 are attached to the outer ends of the struts 43 by means of leg clamps 46 thru slots 47, allowing for both rotational and length adjustment of the legs 44 and 45 with respect to the struts 43 when the leg clamps 46 are loosened. Legs 44 are fastened on opposite ends of a pair of in-line struts 43. Legs 45, one of which is shown in FIGS. 1 and 2, are fastened on opposite ends of the other pair of in-line struts 43.

Feet 48 are attached to the lower ends of legs 44 and 45 by pivoted means, such as rivets 49 as shown in FIGS. 1 and 2, or by other pivoted means such as a ball and socket joint, not shown. When rivets 49 or single plane pivot clamps, not shown, are used, the feet should have foot hinges 50, as shown in FIGS. 1 and 2, or be made of thin gauge flexible material to allow for tilting the leveling base 6 on the one pair of legs 44 when the other pair of legs 45 have loosened leg clamps 46. Only one leg 45 is shown in the FIGS. 1 and 2 cut-away views.

The feet 48 may be attached to any steady surface, such as a table top, tent or surveyor stakes, or a vehicle frame, using screws, bolts, clamps, adhesives or welds, prior to performing the leveling operation.

A plumb bob 51, as shown in FIGS. 1 and 2, may be hung from stand 36 and used for leveling purposes.

Arms 52 may be attached struts 43, as shown in FIGS. 1 and 2, to support an horizon ring 53 for use in determining the time and heading of the sun at sun rise and sun set and for demonstrating the viewer's horizon relative to the polar axis and the equatorial plane. Other means, not shown, such as a single strut slide positioned on the rim of the compass dial 40 may be used to indicate the horizon in relation to the position of the sun's replica 13.

FIG. 4

The major components consist of a solar ray directed assembly 54, straddling a circular segment 55, supported on hinges 56 and 57, aligned on the polar axis of an equatorial mount 58, supported on a stand 59. The circular segment 55 has a holding means 60 for attachment to a clock driven time dial 61.

The solar ray directed assembly 54 is attached to the circular segment 55 by center pivot 62. The solar ray directed assembly 54 is positioned on the circular segment rim 63, and consists of a declination indicator 64, a collector lens 65, collector shelves 66, a declination holding means 67, and straddle parts 68.

The collector lens 65 may be a low cost plastic Fresnel lens and divided in sections to suit a particular lens support arrangement. The collector brackets 66 are located near the focal point of the lens 65 and are used for attachment of solar energy conversion devices, not shown, such as photovoltaic cell arrays or hot water heating coils.

The declination holding means 67, as shown in FIG. 4, is a simple clamp for squeezing the two straddle parts 68 against the circular segment rim 63.

The clock driven time dial 61, as shown in FIG. 4, is a gear centered on pivot pin 69 on the polar axis of the equatorial mount 58 and is rotated at a twenty four hour rate by clock drive 70 attached to equatorial saddle 71.

The holding means 60, as shown in FIG. 4, consists of a satellite gear 72 on clamping post 73, on time indicator bracket 74 attached to the circular segment 55. The satellite gear 72 meshes with the time dial 61 and is locked in position by wing nut 75.

The equatorial mount 58 is supported on its circular outer rim and kept in radial alignment by shoes 76 attached to the stand 59 and bearing at a spaced interval on the said circular outer rim of the equatorial mount 58.

Two latitude holding clamps 77 and inner perimeter guides 78, attached to the stand 59 and in contact with the plane surface adjacent to the circular rims of the equatorial mount 58 are used to hold the equatorial mount 58 against the vertical face of the stand 59 at the latitude setting. The shoes 76 may be rollers with hollow shafts for thru bolts used with the clamps 77.

A leveling base such as shown in FIGS. 1 and 2 may be added for portable use.

While there is described above the principles of this invention in connection with specific apparatus, the descriptions are presented by way of example and not as a limitation to the scope of this invention. It is intended to encompass changes and modifications to the extent they fall within the scope of the appended claims.

What is claimed is:

1. A sun tracking device, comprising:
   a. a support means rotatable about a horizontal axis;
   b. a circular segment mounted on said support means so as to rotate about a principal axis parallel to the face plane of the segment and perpendicular to the said horizontal axis;
   c. a solar ray directed assembly straddling the said circular segment with means for rotating the assembly about an axis through the center of curvature of the circular rim of the segment and normal to the said face plane of the segment;
   d. a solar ray incident member fixed to the outer end of the said solar ray directed assembly and extending laterally on both sides of the said face plane of the segment, said solar ray incident member characterized by a replica of the sun, a disc with apertures for receiving the sun's rays, and a lens for concentrating the sun's rays;
   e. a time element mounted on the said support means, centered and rotatable on the said principal axis of the said circular segment, and having a generally circular rim form as characterized by a disc, a clock dial, and a toothed gear, and;
   f. a holding means for adjustably positioning the said circular segment relative to the said time element.

2. The combination set forth in claim 1 wherein the said support means has an integral saddle for mounting the said time element and a time zone longitude scale adjacent to the circular rim of the time element, said time element having a 24 hour clock dial face cooperating with the said time zone longitude scale.

3. The combination set forth in claim 1 wherein the said time element has a clamping means for holding the said element in a fixed position on the said support means and for releasing the element to allow for its rotation and reversal of its face positions relative to the said support means.

4. The combination set forth in claim 1 wherein the said solar ray directed assembly has an integral shoe making peripheral contact with the said rim of the said circular segment for maintaining radial alignment of the said solar ray incident member.

5. The combination set forth in claim 1 wherein the said solar ray directed assembly has a solar ray target member fixed to the said solar ray directed assembly, spaced inwardly from and radially aligned with the said solar ray incident member.

6. The combination set forth in claim 1 wherein the said support means has a circular rim concentric with the said horizontal axis and is rotatably mounted on a stand, the said stand having a vertical face plane and shoes attached near both edges of the said stand making peripheral contact with the circular rim of the said support means.

7. The combination set forth in claim 1 wherein the said holding means consists of a formed wire pinch release clamp having elements in sliding contact on opposite sides of a dual ramp fixed to the end of the said circular segment nearest the said time element such that pinching the said elements in a lateral direction raises the clamping portion of the said clamp.

8. The combination set forth in claim 1 wherein a horizon ring is provided with strut support means for positioning the top surface of the ring on a level with the said horizontal axis and centering the perimeter of the said top surface about the point of intersection of the said principal axis with the horizontal axis.

9. The combination set forth in claim 7 wherein a leveling base is provided with a horizontal baseplate to which are attached four radially positioned struts spaced 90 degrees apart, legs with pivoted feet clamped to the outer ends of the said struts, clamping means for both length and rotational adjustment of the said legs in relation to the said struts.

10. The combination set forth in claim 7 wherein a leveling base is provided with two pair of adjustable legs and pivoted feet providing stiffness in mutually perpendicular planes while allowing for tilting adjustment in alternate planes during the leveling operation.

* * * * *

UNITED STATES PATENT AND TRADEMARK OFFICE
CERTIFICATE OF CORRECTION

PATENT NO.  : 4,413,423
DATED       : Nov. 8, 1983
INVENTOR(S) : Ralph B. Galvin It is certified that error appears in the above-identified patent and that said Letters Patent is hereby corrected as shown below:

Line 1, Column 2: change the word "of" to "on".

Line 1, Claim 9: change the number "7" to "1".

Line 1, Claim 10: change the number "7" to "1".

Signed and Sealed this

Thirteenth Day of March 1984

[SEAL]

Attest:

Attesting Officer

GERALD J. MOSSINGHOFF

Commissioner of Patents and Trademarks